United States Patent
Yang

(10) Patent No.: US 10,366,281 B2
(45) Date of Patent: *Jul. 30, 2019

(54) GESTURE IDENTIFICATION WITH NATURAL IMAGES

(71) Applicant: PIXART IMAGING INC., Hsin-Chu (TW)

(72) Inventor: Shu-Sian Yang, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/228,897

(22) Filed: Dec. 21, 2018

(65) Prior Publication Data

US 2019/0114471 A1    Apr. 18, 2019

Related U.S. Application Data

(63) Continuation of application No. 15/851,712, filed on Dec. 21, 2017, now Pat. No. 10,198,627, which is a continuation of application No. 14/046,214, filed on Oct. 4, 2013, now abandoned.

(30) Foreign Application Priority Data

Oct. 8, 2012    (TW) .............................. 101137168 A

(51) Int. Cl.
*G06K 9/00*    (2006.01)
(52) U.S. Cl.
CPC ................................ *G06K 9/00355* (2013.01)

(58) Field of Classification Search
None
See application file for complete search history.

(56) References Cited

U.S. PATENT DOCUMENTS

| | | | | |
|---|---|---|---|---|
| 5,454,043 A | * | 9/1995 | Freeman | A61B 5/1121 345/419 |
| 5,687,249 A | * | 11/1997 | Kato | G08G 1/017 340/936 |
| 6,160,901 A | * | 12/2000 | Kage | G06T 7/254 382/107 |
| 6,256,400 B1 | * | 7/2001 | Takata | G06K 9/00335 379/52 |
| 7,983,448 B1 | * | 7/2011 | da Vitoria Lobo | G06K 9/00355 382/103 |
| 8,014,567 B2 | * | 9/2011 | Yoon | G06K 9/00355 345/156 |
| 8,224,619 B2 | * | 7/2012 | Onishi | G06F 3/0304 702/150 |
| 2002/0044691 A1 | * | 4/2002 | Matsugu | G06K 9/20 382/218 |

(Continued)

*Primary Examiner* — Soo Shin
(74) *Attorney, Agent, or Firm* — Li & Cai Intellectual Property (USA) Office

(57) ABSTRACT

A method for gesture identification with natural images includes generating a series of variant images by using each two or more successive ones of the natural images, extracting an image feature from each of the variant images, and comparing the varying pattern of the image feature with a gesture definition to identify a gesture. The method is inherently insensitive to indistinctness of images, and supports the motion estimation in axes X, Y, and Z without requiring the detected object to maintain a fixed gesture.

10 Claims, 9 Drawing Sheets

(56) References Cited

U.S. PATENT DOCUMENTS

| | | | |
|---|---|---|---|
| 2005/0271279 A1* | 12/2005 | Fujimura | G06K 9/00355 382/203 |
| 2007/0009157 A1* | 1/2007 | Shirasaka | H04N 19/61 382/190 |
| 2010/0306699 A1* | 12/2010 | Hsu | G06F 3/017 715/810 |
| 2011/0013807 A1* | 1/2011 | Lee | G06K 9/00355 382/107 |
| 2011/0216941 A1* | 9/2011 | Saijo | G06K 9/00355 382/103 |
| 2012/0200494 A1* | 8/2012 | Perski | G06F 3/017 345/156 |
| 2013/0182902 A1* | 7/2013 | Holz | G06K 9/3233 382/103 |
| 2013/0279763 A1* | 10/2013 | Wang | G06K 9/00355 382/107 |
| 2014/0029789 A1* | 1/2014 | DeLean | G06K 9/20 382/103 |
| 2014/0064557 A1* | 3/2014 | Hara | G06F 3/017 382/103 |
| 2017/0139487 A1* | 5/2017 | Kimura | G06K 9/00355 |

\* cited by examiner

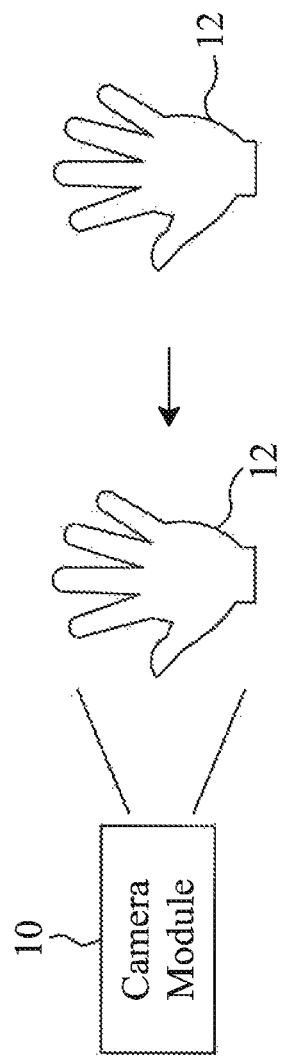

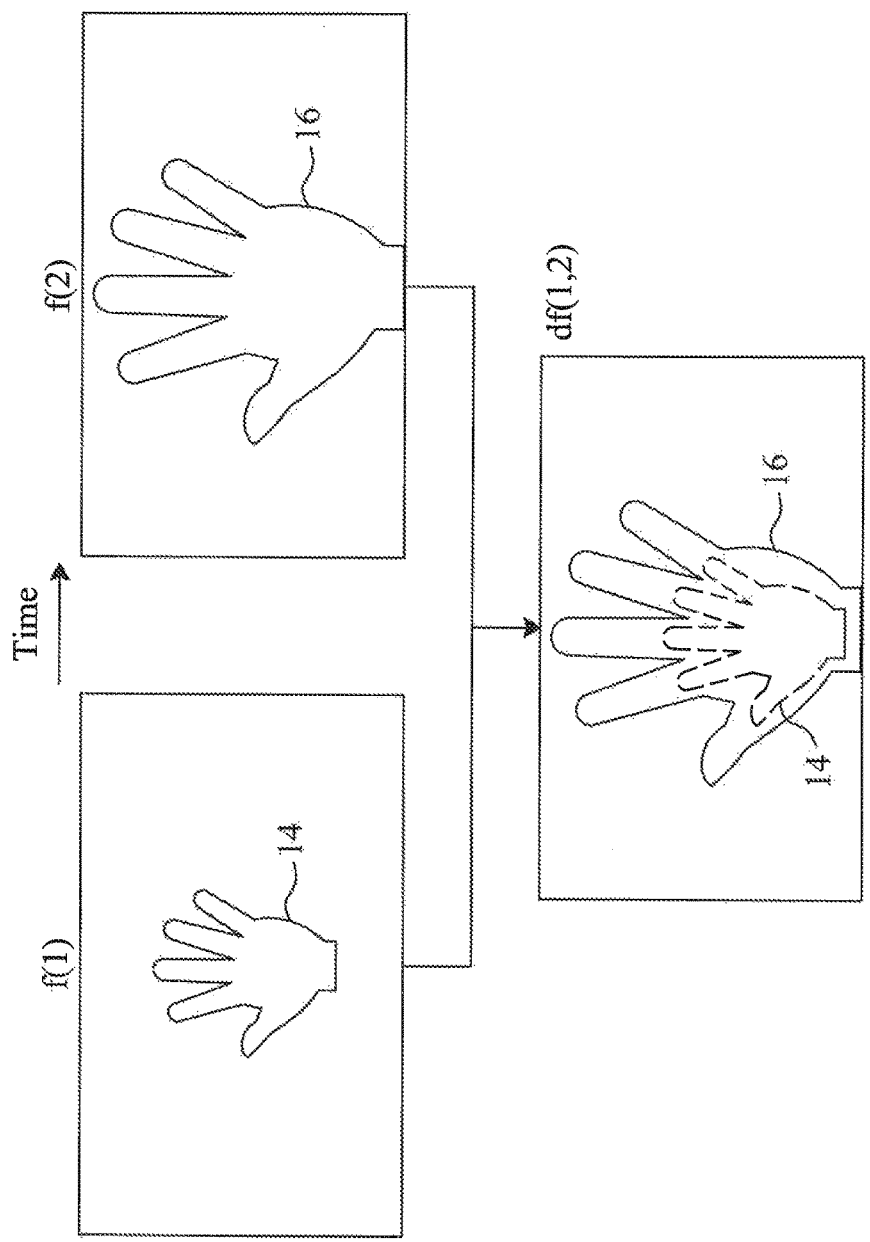

GESTURE IDENTIFICATION WITH NATURAL IMAGES

CROSS REFERENCE TO RELATED APPLICATION

This application is a continuation application of U.S. application Ser. No. 15/851,712, filed on Dec. 21, 2017 which is also a continuation application of U.S. application Ser. No. 14/046,214, filed on Oct. 4, 2013, and the entire contents of which are hereby incorporated herein.

FIELD OF THE INVENTION

The present invention is related generally to a method for gesture identification and, more particularly, to a method for gesture identification with natural images.

BACKGROUND OF THE INVENTION

Gesture-control systems provide simple and intuitional convenient operation. However, the systems using touch-controlled human-machine interfaces such as touch panels require users to perform operation by directly contacting the interfaces, thus being inconvenient to some applications. Contrary, the gesture-control systems using non-touch interfaces allows users to perform operation at a relatively distant place therefrom, while being more difficult to implement because such systems determine gestures by capturing and identifying images. Currently, the methods for image-based gesture identification can be classified into two categories, one using natural images without auxiliary illuminant, while the other using unnatural images generated by one or more auxiliary light sources.

Compared to the gesture-control systems using auxiliary illuminant, the gesture-control systems not using auxiliary illuminant are more advantageous because they require lower costs, can be combined with a camera, and save power, while having the innate weakness of more difficulty in gesture identification. The methods for gesture identification employed by a gesture-control system not using auxiliary illuminant are typically established on either motion estimation or shape detection. Since gestures and operational habits are usually different among users, gesture identification using motion estimation is particularly weak in identifying certain gestures, such as click and zoom in/out that include Z-axis motions. On the other hand, gesture identification using shape detection usually requires users to operate with certain gestures that are fixed and recognizable to the system, for example, making a fist or opening a palm. FIG. 1 and FIG. 2 illustrate a conventional method for gesture identification using shape detection, in which a camera module 10 captures images at a constant frame rate. If a user waves his/her palm horizontally, namely along the X axis or the Y axis, before the camera module 10, the camera module 10 will obtain successive images, such as f(1) and f(2) shown in FIG. 2, in which the positions of the profiles 14 and 16 of the hand 12 in the two images f(1) and f(2) are different. The system first identifies a certain portion of the profiles that has a predetermined shape from the images f(1) and f(2), for example, the fingertips 18 and 20 of the index finger, and then uses the positional difference between the fingertip images 18 and 20 in the images f(1) and f(2) to identify that the gesture is one performing a rightward wave. This conventional method requires high-definition images for correct recognition of the image with the predetermined shape, and is not adaptive to indistinct images caused by fast motions of an object, thus being unsuitable for applications related to short distance. Furthermore, if the user changes his/her hand posture in the course of operation, the system may fail to recognize the image of the predetermined shape and become unable to identify the gesture. Since the recognizable images are limited to those of certain shapes, some gestures are not definable and this greatly restricts the scope of operational gestures. In general, only those gestures displaying apparent characteristics can be predefined in the system. Additionally, since significant variation exists between the images of a user's hand when the hand moves away from or toward the camera module 10, the conventional method is not supportive to gestures performing Z-axis (i.e. vertical) motions.

The method for gesture identification using shape detection includes recognizing the region of skin color in an image, then identifying the shape of the recognized region of skin color, and finally finding out where a hand is in the image. However, skin-color analysis requires complex algorithm and is color temperature dependent, so the error rate is relatively high. Shape recognition also needs complex algorithm. These processes need numerous arithmetic operations, and thus require higher costs for both software and hardware, and slower down the system's response.

SUMMARY OF THE INVENTION

An objective of the present invention is to provide a method for gesture identification with natural images.

Another objective of the present invention is to provide a method for gesture identification inherently insensitive to indistinctness of images.

Yet another objective of the present invention is to provide a method for gesture identification useful to short distance applications.

Still another objective of the present invention is to provide a method for gesture identification capable of supporting the motion estimation in axes X, Y, and Z without requiring the detected object to maintain a fixed gesture.

Yet still another objective of the present invention is to provide a method for gesture identification without requiring a predetermined gesture shape.

A further objective of the present invention is to provide a method for gesture identification independent of color temperature.

Yet a further objective of the present invention is to provide a method for gesture identification with less calculation.

Still a further objective of the present invention is to provide a lower cost method for gesture identification.

According to the present invention, a method for gesture identification with natural images includes the steps of generating a series of images over time, selecting two or more successive images from the series of images to generate a variant image, extracting an image feature from the variant image, and comparing a varying pattern of the image feature with a gesture definition to identify the gesture.

Since the disclosed method eliminates the use of image recognition and needs not to detect the position of an object in an image, it is free from the shortcomings of the conventional methods.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which:

FIG. 7 is a schematic diagram showing a gesture performing a vertical motion before a camera module;

FIG. 8 is an illustrative diagram showing detection of the gesture shown in FIG. 7.

DETAILED DESCRIPTION OF THE INVENTION

Figure 1:
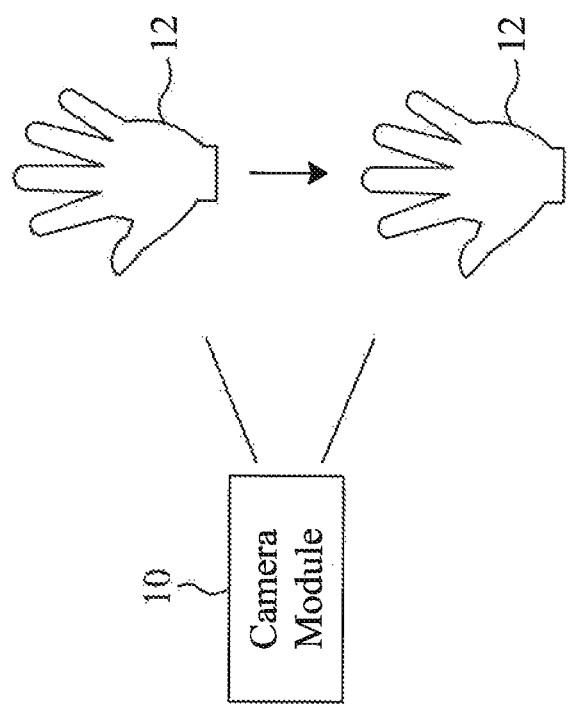
FIG. 1 is a schematic diagram showing a conventional method of a gesture performing a horizontal motion before a camera module.
Figure 2:
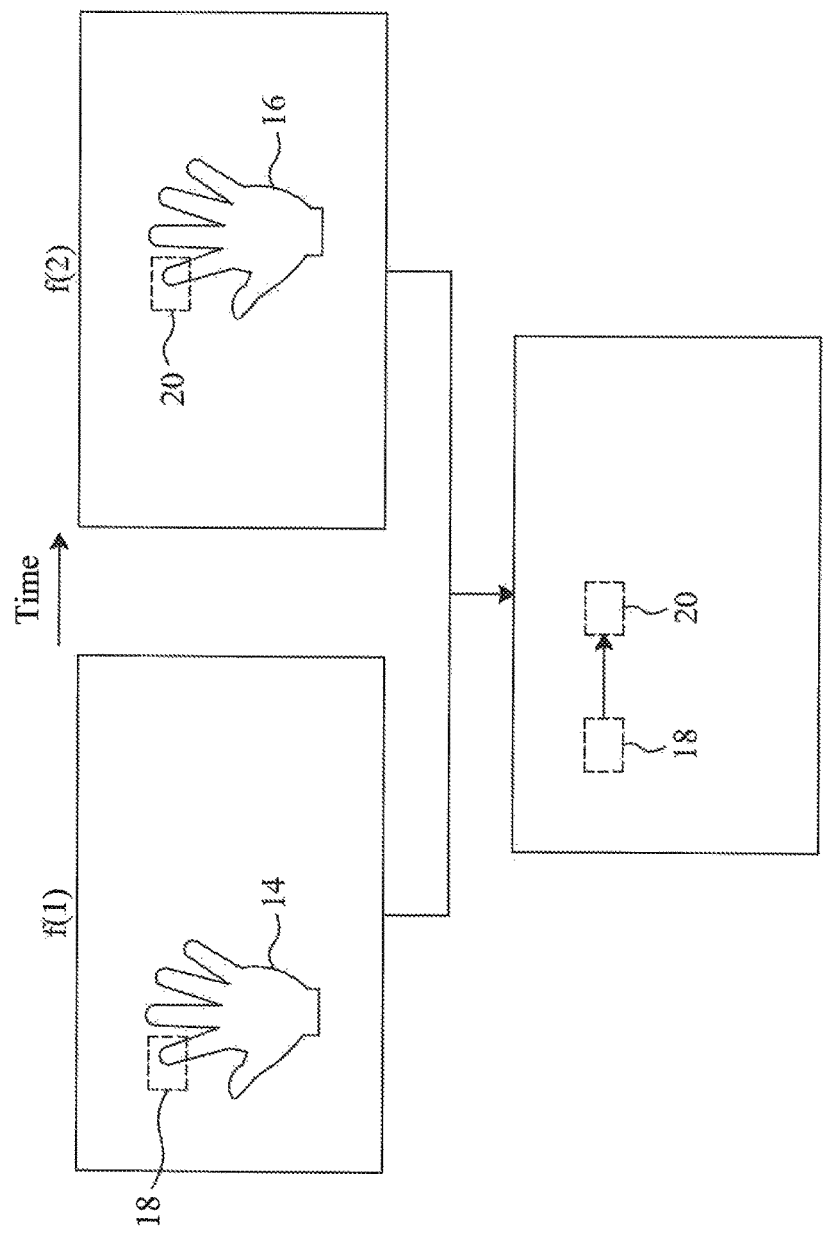
FIG. 2 is an illustrative diagram showing a conventional method for gesture identification.
Figure 3:
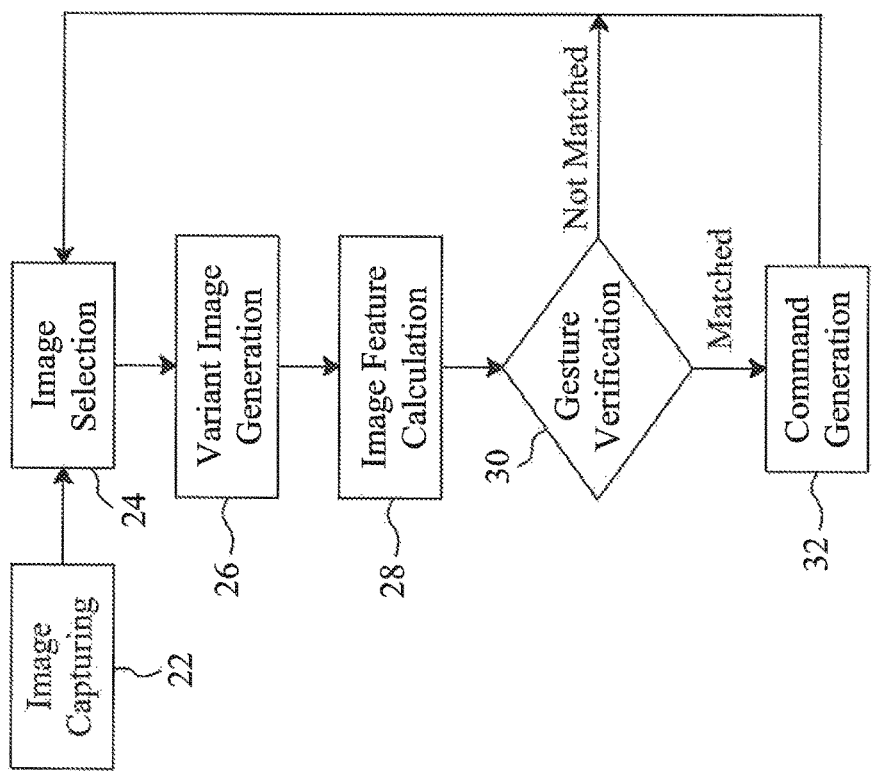
FIG. 3 is a flowchart of an embodiment according to the present invention.

FIG. 3 is a flowchart of an embodiment according to the present invention, in which the method includes image capturing in step 22, as does in conventional methods. For example, as shown in FIG. 1, a camera module 10 captures images from a hand 12 at a predetermined frame rate, and thus generates a series of images along the time axis. Then, two or more successive images are selected from the time-based series of images in step 24, and the selected successive images are used to generate a variant image in step 26. Usually, the variant image can also be defined as a differential image, that is, the variant image (or the differential image) has a difference between selected successive images. Basically, the variant image includes a value calculated through a predetermined formula. For example, the value refers to the brightness difference of each pixel in the selected successive images, for expressing the change of the selected successive images over the time axis. Step 28 further extracts an image feature from the variant image, for example, calculating a barycenter, a standard deviation, or a variance of the variant image. Step 30 performs gesture verification by comparing the varying pattern of the image feature with predetermined gesture definitions. If a predetermined gesture definition is matched in the gesture verification executed by step 30, a command corresponding to the matched gesture definition is generated in step 32 and then the process returns back to step 24; otherwise, the process returns back to step 24 directly. Since this method uses the entire frame of image to identify the gesture without considering the profile portion of the image, there is no need of recognizing the shape of the detected object and finding out the position of the detected object, and thus it has excellent insensitivity to indistinct images and is independent of the shape and color temperature of the detected object, and the object to be detected is not limited to be a hand. For it less requires the definition of images, this method can identify gestures as fast swipes, and thus is also suitable for short distance applications. In addition, this method requires relatively simple algorithm and fewer arithmetic operations, so the system responds faster and costs less in software and hardware.

In the following paragraphs, examples of identifying sliding, rotating, and zooming gestures will be described to illustrate the present invention in further details.

Figure 4:
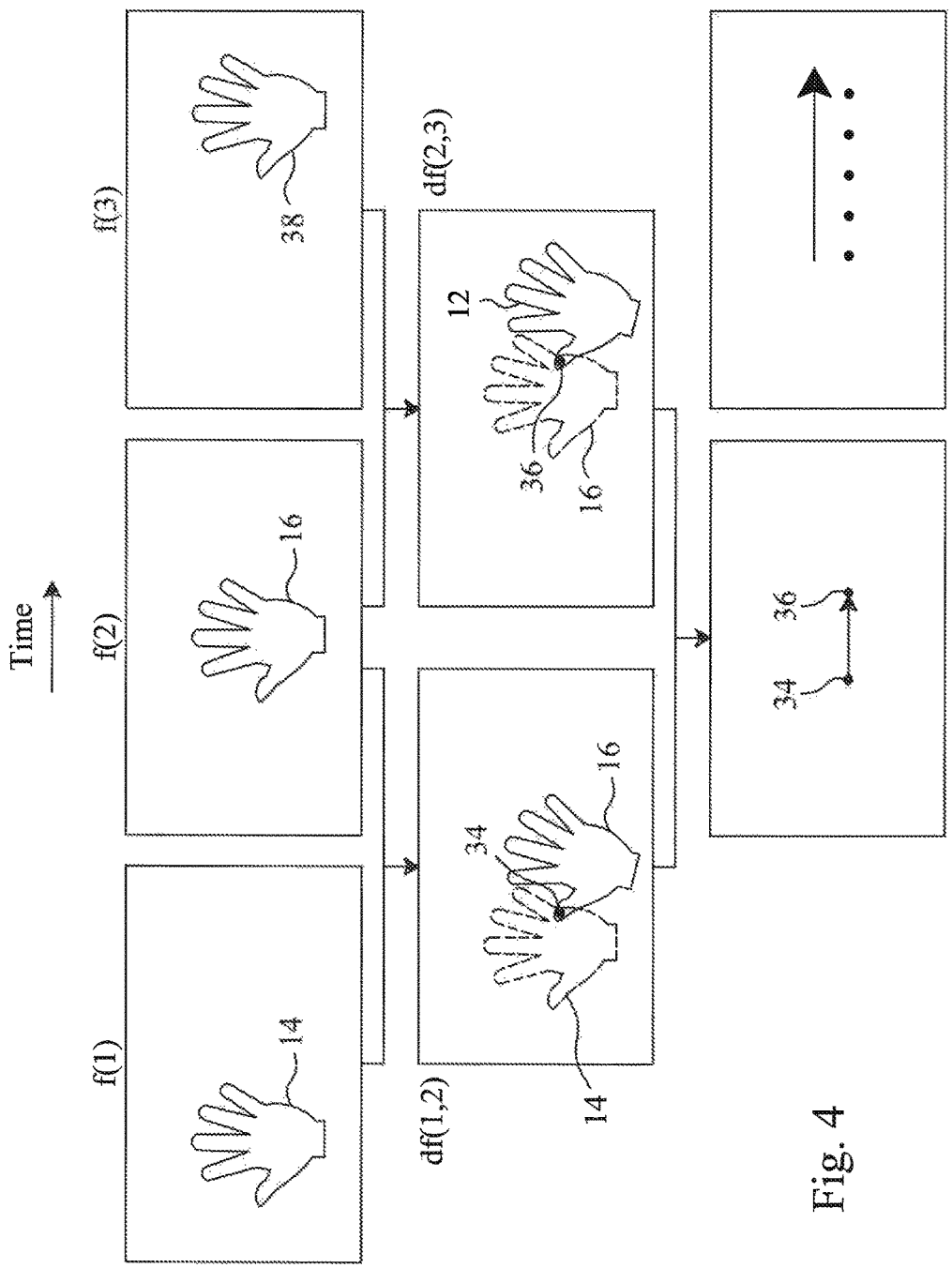
FIG. 4 is an illustrative diagram showing detection of a gesture performing a horizontal motion.

Referring to FIG. 1, when a hand 12 swipes horizontally before a camera module 10, the camera module 10 generates a series of images along the time axis, as shown in FIG. 4. Each two successive frames of images are selected to generate a variant image, for example, a variant image df(1,2) generated from images f(1) and f(2) by, for example, subtracting the former image f(1) from the latter image f(2), i.e. df(1,2)=f(2)−f(1), and a variant image df(2,3) generated from images f(2) and f(3) by the same process. The variant image df(1,2) is used for calculation to extract an image feature, for example, the position of its barycenter 34. Similarly, an image feature of the variant image df(2,3) is also extracted by calculation with the variant image df(2,3), which is the position of the barycenter 36 of the variant image df(2,3) in this example. Since the profiles 14, 16, and 38 of the hand 12 are positioned differently in the images f(1), f(2), and f(3), the positions of the barycenters 34 and 36 in the variant images df(1,2) and df(2,3) are different. In this manner, the positions of a barycenter of more variant images are obtained, for example, as shown in the right bottom image of FIG. 4, presenting a varying pattern of a rightward motion. If this varying pattern matches to one of the predetermined gesture definitions, the detected gesture is identified as that predefined gesture, for example, a click gesture.

Figure 5:
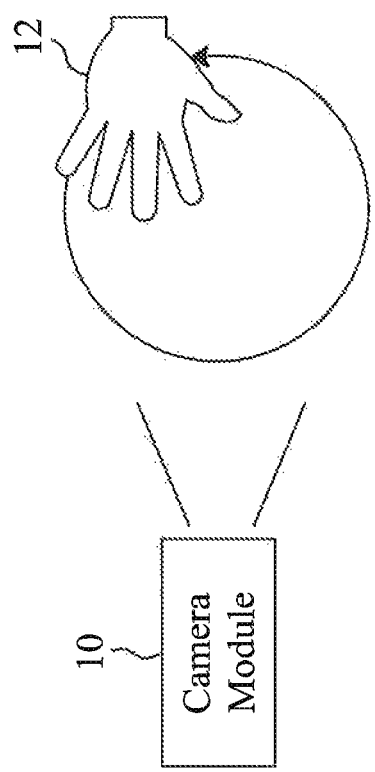
FIG. 5 is a schematic diagram showing a gesture performing a rotational motion before a camera module.
Figure 6:
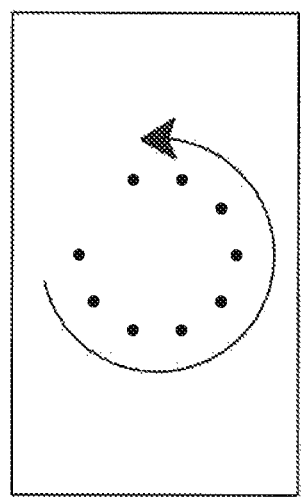
FIG. 6 is an illustrative diagram showing a varying pattern generated from the gesture shown in FIG. 5.

Referring to FIG. 5, when a user's hand 12 draws a circle before the camera module 10, the positions of the barycenter of the variant images represent a varying pattern as shown in FIG. 6, which may be used to generate a command for rotating operation.

Figure 9A:
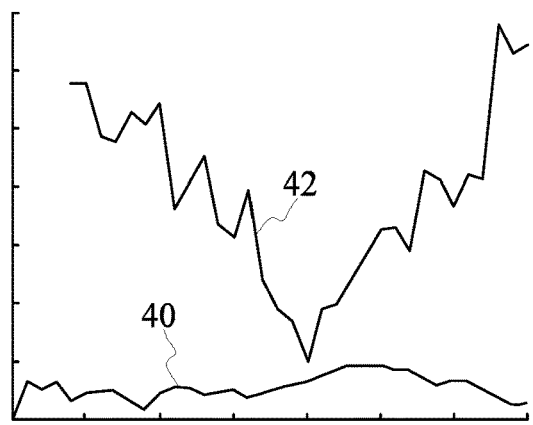
FIGS. 9a, 9b, and 9c are illustrative diagrams showing varying patterns generated by different gestures.
Figure 9B:
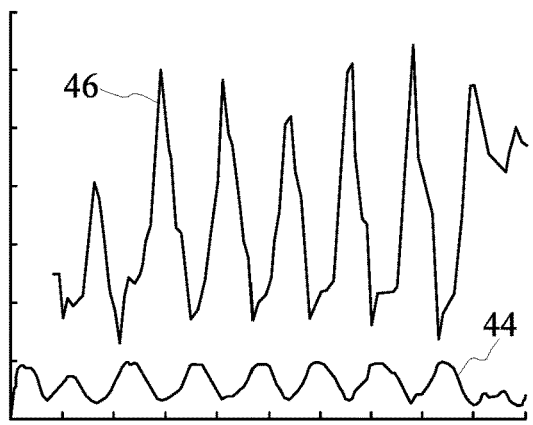
Figure 9C:
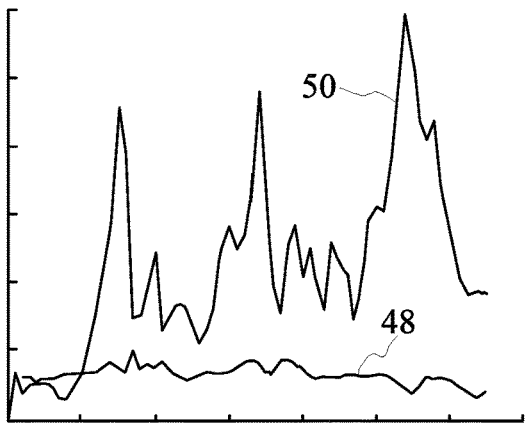

Referring to FIG. 7, when a user's hand 12 moves toward the camera module 10, the camera module 10 will capture successive images as shown in FIG. 8, in which the profiles 14 and 16 of the hand 12 display no or little variation therebetween in the successive images f(1) and f(2) in terms of position, but are obviously different in terms of size. Such a gesture is useful to generate a command for zooming operation. By using the successive images f(1) and f(2) to generate a variant image df(1,2), for example, df(1,2)=f(2)−f(1). Variant images obtained by this process will present a varying pattern that has no or less variation in terms of positions of the barycenter of the variant images, yet a significant size difference between the profiles 14 and 16. The significant size difference can be apparent when expressed by another image feature of the variant images. For example, referring to FIGS. 9a-9c, a barycenter and a variance derived from the pixel coordinates of a variant image obtained by subtracting between successive images show gesture-specific varying patterns. In the case of a swiping gesture, the varying pattern over time, as shown in FIG. 9a, has a smooth average as shown by the curve 40, and has a variance not continuously and regularly moving up and down as shown by the curve 42. In the case of a rotating gesture, the varying pattern over time, as shown in FIG. 9b, has both of the average and the variance showing continuous and regular waves as shown by the curves 44 and 46. In the case of a zooming gesture, the varying pattern over time, as shown in FIG. 9c, has a variance continuously and regularly moving up and down as shown by the curve 50, and an average showing less change as shown by the curve 48.

There have been many well-known processes for calculation of an image feature of an image, and any parameters or mathematical formulas capable of expressing the change of images can be used in the method according to the present invention.

In other embodiments, apart from calculating an image feature from a variant image, frequency analysis may be used to process the image feature, for example, applying Fourier transform to convert the movement of images along the vertical and transverse axes from the time domain into the frequency domain, so as to determine the varying pattern. The varying pattern acting as a gesture definition may be set by system designers.

For extracting an image feature from a variant image, a threshold may be added for screening pixels, and only the pixels with a brightness change exceeding the threshold are used in calculating the image feature, so as to improve accuracy.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A method for identifying a gesture using natural images, wherein the method is independent of color temperature and adaptive to indistinct images caused by fast motion of an object, comprising the steps of:
    selecting a plurality of successive images from a series of the images frames, wherein for each of the selected plurality of successive images, entire image frames are used to generate a plurality of variant images; and
    comparing a varying pattern of the variant images with a gesture definition to identify the gesture;
    wherein the method does not comprise the steps of:
    recognizing a shape of a gesture in each of the selected plurality of successive images, and
    determining a position of the gesture in each of the selected plurality of successive images.

2. The method of claim 1, wherein the step A comprises generating the series of the images before selecting the plurality of successive images from the series of the images frames.

3. The method of claim 1, wherein the step A comprises subtracting between the selected plurality of successive images.

4. The method of claim 1, wherein the step B comprises extracting a plurality of image features from the variant images, and comparing a varying pattern of the variant images corresponding to the varying pattern of the extracted plurality of image features with the gesture definition to identify the gesture.

5. The method of claim 1, wherein the step B comprises processing the natural images by a frequency analysis to determine the varying pattern.

6. A method for identifying a gesture using natural images, wherein the method is independent of color temperature and adaptive to indistinct images caused by fast motion of an object, comprising the steps of:
    comparing the entire image frames of each of a plurality of successive images to generate a plurality of differential images from the series of the images; and
    comparing at least one of the differential images with a gesture definition to identify the gesture;
    wherein the method does not comprise the steps of:
    recognizing a shape of a gesture in each of the plurality of successive images, and
    determining a position of the gesture in each of the plurality of successive images.

7. The method of claim 6, wherein the step A comprises subtracting between the plurality of successive images.

8. The method of claim 6, wherein the gesture includes a hand swiping leftward motion, a hand swiping rightward motion or a hand rotation motion.

9. The method of claim 6, wherein the step B comprises processing the differential images by a frequency analysis to determine a varying pattern.

10. The method of claim 9, wherein the step B comprises comparing the varying pattern of the differential images with the gesture definition to identify the gesture.

* * * * *